(12) United States Patent
Kall

(10) Patent No.: US 7,076,257 B2
(45) Date of Patent: Jul. 11, 2006

(54) TELECOMMUNICATIONS SYSTEM (75) Inventor: Jan Kall, Esbo (FI)

(73) Assignee: Nokia Corporation, Espoo (FI)

( * ) Notice: Subject to any disclaimer, the term of this patent is extended or adjusted under 35 U.S.C. 154(b) by 266 days.

(21) Appl. No.: 10/148,481

(22) PCT Filed: Nov. 30, 2000

(86) PCT No.: PCT/EP00/12192

§ 371 (c)(1),
(2), (4) Date: Nov. 6, 2002

(87) PCT Pub. No.: WO01/41468

PCT Pub. Date: Jun. 7, 2001

(65) Prior Publication Data

US 2004/0180669 A1 Sep. 16, 2004

(30) Foreign Application Priority Data

Dec. 1, 1999 (GB) ................................. 9928416.8

(51) Int. Cl.
H04Q 7/20 (2006.01)

(52) U.S. Cl. ........................ 455/456.1; 455/404.2; 455/414.2

(58) Field of Classification Search ......... 455/456.1–6, 455/457, 414.1, 456.2, 456.3, 404.2, 4, 41
See application file for complete search history.

(56) References Cited

U.S. PATENT DOCUMENTS

| | | | | |
|---|---|---|---|---|
| 5,293,645 A * | 3/1994 | Sood | ........................ | 455/456.2 |
| 5,365,451 A | 11/1994 | Wang et al. | ................. | 701/213 |
| 5,552,772 A * | 9/1996 | Janky et al. | ............. | 340/573.4 |
| 5,669,061 A * | 9/1997 | Schipper | ..................... | 455/429 |
| 5,719,587 A * | 2/1998 | Rodal | .......................... | 343/791 |
| 5,809,424 A | 9/1998 | Eizenhoefer | ................. | 455/456 |
| 5,828,987 A * | 10/1998 | Tano et al. | .................. | 702/150 |
| 5,926,133 A * | 7/1999 | Green, Jr. | .................... | 342/363 |
| 5,926,765 A * | 7/1999 | Sasaki | ..................... | 455/456.1 |
| 5,973,643 A * | 10/1999 | Hawkes et al. | ............. | 342/457 |
| 6,132,391 A * | 10/2000 | Onari et al. | ................. | 600/595 |
| 6,167,268 A * | 12/2000 | Souissi et al. | .............. | 455/434 |
| 6,321,092 B1 * | 11/2001 | Fitch et al. | .............. | 455/456.5 |
| 6,323,775 B1 * | 11/2001 | Hansson | ................... | 340/636.1 |
| 6,486,831 B1 * | 11/2002 | Martorana et al. | .......... | 342/458 |
| 6,553,262 B1 * | 4/2003 | Lang et al. | ..................... | 607/32 |
| 6,556,831 B1 * | 4/2003 | Buppelmann | ............. | 455/456.2 |
| 6,603,966 B1 * | 8/2003 | Sheffield | ..................... | 455/423 |

(Continued)

FOREIGN PATENT DOCUMENTS

EP 0546758 12/1991

(Continued)

OTHER PUBLICATIONS

Notice of Rejection Reasons (English Language Summary) in counterpart Japanese Application, JPO, Aug. 23, 2005.

(Continued)

Primary Examiner—CongVan Tran
(74) Attorney, Agent, or Firm—Lackenbach Siegel LLP (57) ABSTRACT A telecommunications system and a method for use in a telecommunications system is disclosed. The system comprises at least one station, means for determining the location of said station in said system, and means for providing information on said location of said station to a location service client The system is also provided with means for defining in dependence on information relating to the client, the accuracy of the location information to be provided to the client. Different accuracy classes can be provided.

23 Claims, 4 Drawing Sheets

U.S. PATENT DOCUMENTS 6,741,863 B1 * 5/2004 Chiang et al. ........... 455/456.1
6,748,226 B1 * 6/2004 Wortham ................ 455/456.6

FOREIGN PATENT DOCUMENTS

| | | |
|---|---|---|
| JP | 05-327605 | 12/1993 |
| JP | 10-170625 | 6/1998 |

OTHER PUBLICATIONS

"Digital Cellular Telecommunications System (Phase 2+); Location Services (LCS); Service descri (GSM 02.71 version 7.0.0 Release 1998)"; ETSI TS 101 723 V7.0.0, Aug. 1, 1999, pp. 1-18.

* cited by examiner

TELECOMMUNICATIONS SYSTEM

FIELD OF THE INVENTION

The present invention relates to telecommunications system and in particular but not exclusively to a wireless cellular telecommunications network.

BACKGROUND OF THE INVENTION

A cellular telecommunications system is based around cells or similar radio coverage areas. Examples of cellular telecommunications systems include standards such as the GSM (Global System for Mobile communications) or various GSM based systems (such as GPRS: General Packet Radio Service), AMPS (American Mobile Phone System) or DAMPS (Digital AMPS) or third generation standards based typically on the WCDMA (Wideband Code Division Multiple Access), such as the UMTS (Universal Mobile Telecommunications System) etc. In general, a cell coverage area or a base station coverage area of a cellular telecommunications system can be defined as a certain geographically limited area covered by one or several base transceiver stations (BTS) serving mobile stations (MS) via an air or radio interface and usually connected to a base station subsystem (BSS). Each of the coverage areas can be controlled by an appropriate controller apparatus. For example, in the WCDMA based systems each cell is controlled by at least one radio network controller (RNC) and in the GSM standard each cell is controlled by at least one mobile switching center (MSC). The controller is connected further to a gateway or linking apparatus, such as a serving GPRS support node (SGSN) or gateway mobile switching center (GSMC), linking the cell to the: other parts of the communication system. Several cells cover a larger area, and form together the coverage area of a cellular telecommunications network.

The mobile station (MS) or similar user equipment (UE) within one of the cells of the telecommunications system is correspondingly controlled by the controller of the given cell. Even though the MS may be controlled by only one controller at time, it may also be connected simultaneously to several controllers, e.g. when the cells overlap or in the so called soft handoff mode, where the MS may be in simultaneous communication with two base stations, and those base stations may be connected to different controllers. One of these controllers can be defined as the serving (main) controller whereas the others act as secondary controllers.

In the context of the location of a mobile station, and thus the user thereof, the use of cells or similar geographically limited radio coverage areas and associated controllers facilitates the cellular telecommunications system to produce at least a rough location information estimate concerning the current location of an individual mobile station. More particularly, the cellular telecommunications system is always aware of the current location of such mobile stations which are communicating with at least one of the base stations of the system and thus registered within at least one of the controllers of the system (i.e. are located within the area of one cell of the system). This information is available even when the mobile station is located within a coverage area of a visited or "foreign" network, as the visited network is capable of transmitting the location of the mobile station back to the home location register, e.g. for the purposes of routing and charging.

This location information could also be used for other purposes than solely for call processing (routing, charging, resource allocation etc.). There are several possible commercial and non-commercial applications which could use this location information if it were readily available. These possible applications include different local advertisement and information distribution schemes (e.g. transmission of information directed to those mobile users only who are currently within a certain area), area related WWW-pages (such as time tables, local restaurants, shop or hotel guides, maps local advertisements etc.) for the users of mobile data processing devices, location of those who have called to an emergency number and tracking of mobile users by anyone who wishes to receive this information and is legally entitled to obtain it. An application requiring precise and real-time location information of the movement of a mobile station is a mobile station movement prediction feature that could be utilized, for example, in dynamic network resource allocation. There are various other possible uses of the location information and applications, which could use the location information. All applications, which need location information relating to the geographical location of the mobile station, could find the location information provided by means of a telecommunications system useful. The usability of this location information could even be substantially increased by improving the accuracy of the location information provided by the telecommunications system.

There is a proposal for a location service feature provided by means of a cellular telecommunications network which could provide the last known location of a mobile station together with a time-stamp. This feature can be provided by a separate network element or server which receives the information from the various controllers of the system. For example, in the GSM this information can be obtained from a Visitor Location Register (VLR) of the visited MSC or the Home location Register (HLR) of the home network. This proposal would give the location to an accuracy of one base station or cell, i.e. it would indicate that the mobile station is (or at least was) within the coverage area of a certain base station or cell. When the last coverage area within which the mobile station is positioned is known by the system, an appropriate processor facility may then define the rough geographical location of the mobile station on the basis of the radio coverage area information.

The accuracy of the location determination can be improved by utilizing results of measurements which define the travel time (or travel time differences) of the radio signal sent by the mobile station to the base station. The measurements are preferably accomplished by at least three different base stations covering the area in which the mobile station is currently located. The measurement by each of the three base stations gives the distance (range) between the base station and the mobile station or distance difference (range difference) between the mobile station and two base stations. Each of the range measurements generates a circle centered at the measuring base station. Each of the range difference measurement creates a hyperbola (not a circle as in the range measurements). Thus if range differences are used in the location calculation, the intersections of the hyperbolas are searched for. In an ideal case and in the absence of any measurement error, the intersection of the three circles by the three base stations or the hyperbolas would unambiguously determine the location of the mobile station.

SUMMARY OF THE INVENTION

According to one aspect of the present invention, there is provided a telecommunications system comprising at least one station; means for determining the location of said station; means for providing information on said location of said station to a location service client; and means for defining in dependence on information relating to the client, the accuracy of the location information to be provided to the client.

According to a second aspect of the present invention, there is provided a method for use in a telecommunications system comprising the steps of determining the location of a station in said system; providing information on said location of said station to a location service client; and defining the accuracy of the location information to be provided to the client in dependence on information relating to the client.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

Figure 1:
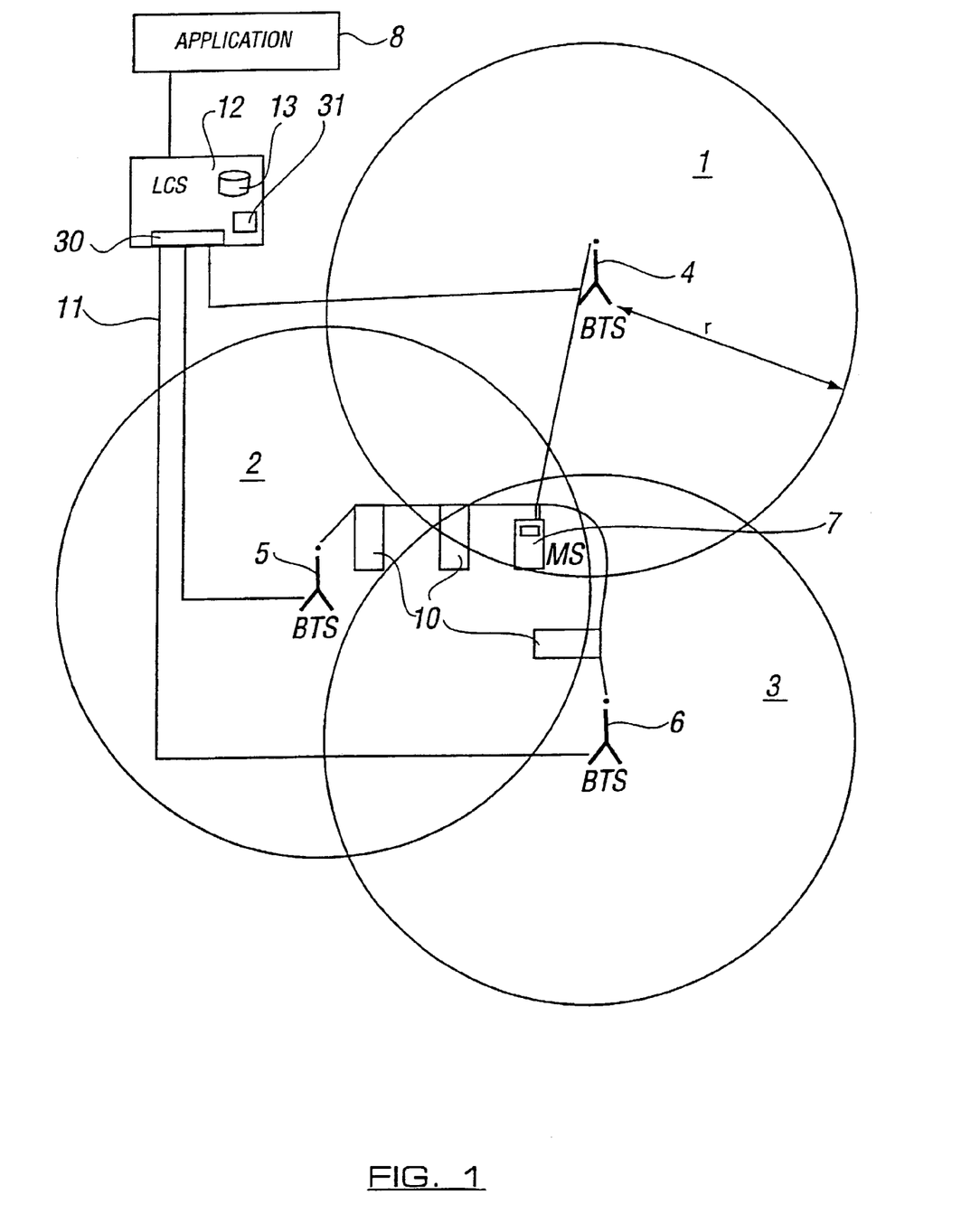
FIG. 1 shows a schematic diagram of three radio coverage areas of a cellular telecommunications system in which the embodiments of the invention can be implemented.

Reference will first be made to FIG. 1 in which three base stations provide omnidirectional radio coverage areas 1, 2 and 3 of a telecommunications network. It is noted that even though the exemplifying telecommunications network shown and described in more detail in the following uses the terminology of a GSM (Global System for Mobile communications) public land mobile network (PLMN), it should be appreciated that the proposed solution can be used in any system providing communications between a transmitting station and a receiving station. It should also be appreciated that even though FIG. 1 shows three base station coverage areas, the invention can be implemented using one, two or more than three coverage areas. The coverage areas 1, 2 and 3 can also be, instead of base station coverage areas, three cell coverage areas of the mobile telecommunications network, wherein the coverage area of one cell can include more than one base station. It is also possible to group cells such that one coverage area comprises more than one cell (For example, an, URA (UMTS Terrestrial Radio Access Network Registration Area) consists of a group of cells).

Figure 2:
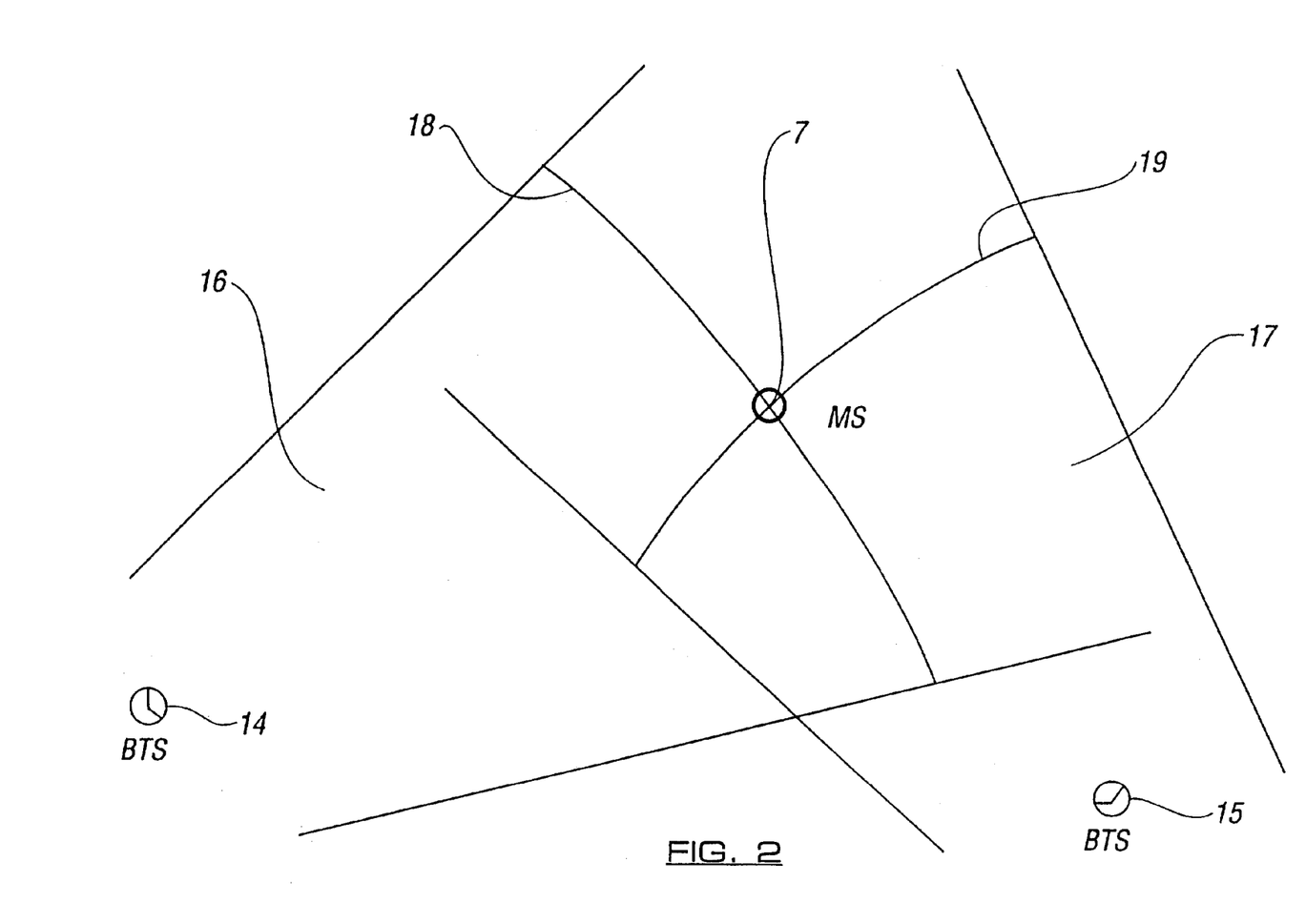
FIG. 2 shows two radio coverage areas provided by sector antennas.

FIG. 2 shows two radio coverage areas 16 and 17 which consist of sectors of base stations 14 and 15 provided with directional or sector antennas. The base stations may use e.g. three 120° directional antennas whereby three radio coverage areas are provided, or four 90° directional antennas providing four radio coverage areas and so on, or any combinations of different radio coverage beam widths.

In FIG. 1 each radio coverage area 1, 2 and 3 is served by the respective base transceiver station (BTS) 4, 5 and 6. More particularly, each base transceiver station BTS is arranged to transmit signals to and receive signals from the mobile station (MS) 7. Likewise, the mobile station 7 is able to transmit signals to and receive signals from the respective base transceiver station. The mobile station 7 accomplishes this via wireless communication with the base stations. Typically a number of mobile stations will be in communication with each base station although only one mobile station is shown in FIG. 1 for clarity. Each of the base stations is connected to a respective network controller (not shown), which in the exemplifying GSM system is a Mobile Services Switching Center (MSC). It is noted that more than one base station can be connected to each controller. Typically more than one controller is also provided in a network. The controller is connected to other elements of the network via a suitable linking or gateway apparatus (not shown), such as Gateway Mobile Switching Center (GMSC) or a serving GPRS Support Node (SGSN).

The mobile station 7 is able to move from one coverage area to another coverage area. The location of the mobile station 7 may thus vary in time as the mobile station is free to move from one location (base station coverage area or cell coverage area) to another location (to another coverage area) and also within one coverage area.

Figure 3:
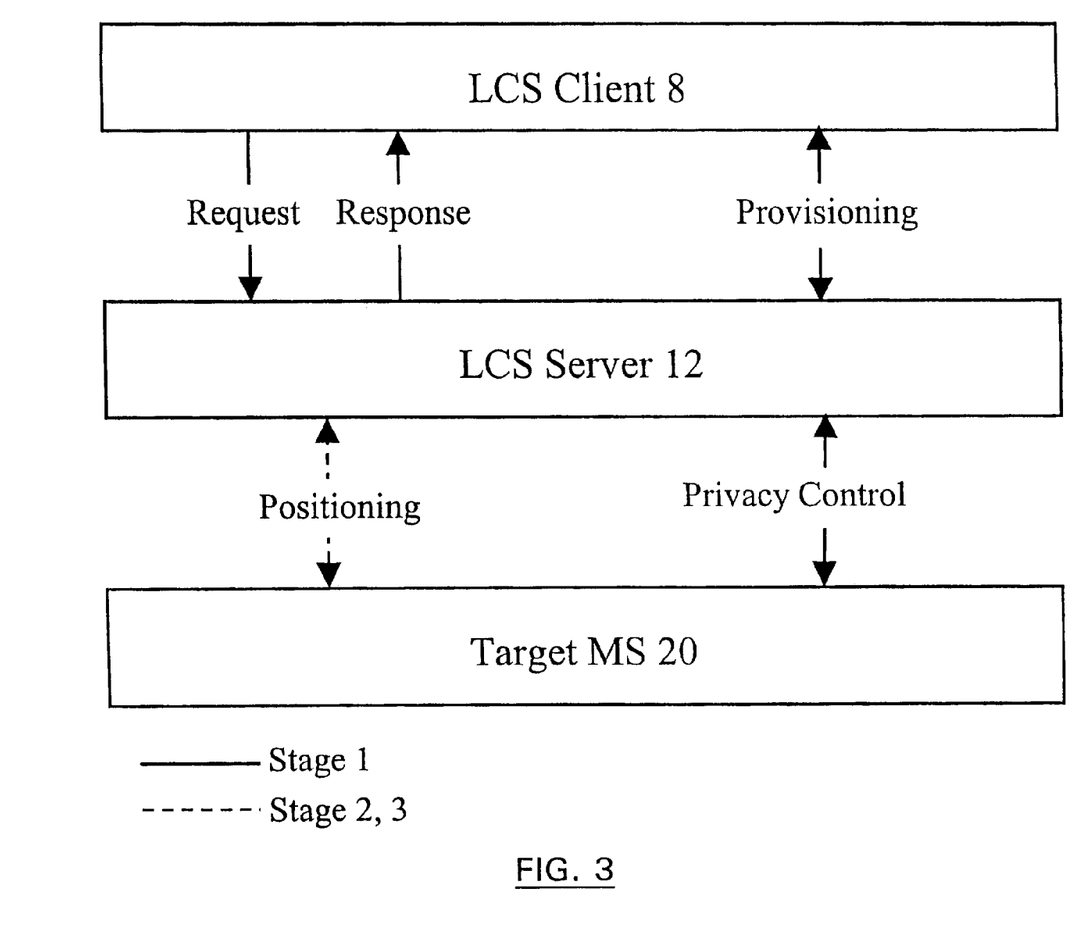
FIG. 3 illustrates one possible functional diagram for a location server.

FIG. 1 also shows a Location Services (LCS) node 12 providing Location (LC) services for different applications or clients 8 who are entitled to receive at least some degree of information concerning the location (or location history) of a mobile station. FIG. 3 illustrates in more detail one proposal according to ETSI (European telecommunications Standards Institute) technical specification "Location Services" (T1P1.5/99-048r4) for the functional diagram of the location server 12. In general terms, the LCS functionality can be defined as a feature capable of providing information concerning the location of the MS, and more particularly, the location defined on the basis of the position of the mobile station relative to the base station(s) of the mobile telecommunications network.

The location server node 12 is arranged to receive, by receiving means 30, predefined information concerning the location of the mobile station 7 and to process this information and/or some other-predefined parameters and/or to compute by processor means 31 appropriate calculations for determining and outputting the geographical location of the given mobile station 7. The location server node 12 may also comprise a register or database 13 for storing radio coverage area specific data. This radio coverage area specific data can be alternatively stored in the base station itself or in the controller controlling the base station, from where it is transmitted to the location server node 12 for the calculations. The data is received from the telecommunications system by receiving means 30.

Even though not shown in detail, the location server node 12 can be connected by means of an appropriate interface to the network controllers (omitted from FIG. 1 for clarity but previously discussed) controlling the base stations signalling with the MS 7.

It is also noted that even though the location server node 12 can be a separate node from a network controller, it could also be a part or an internal component or functionality of a controller, or gateway controller or any other element of the telecommunications system.

The determination of the location of a mobile station can be based on measurements of at least one feature of the received radio signal. A feature which can be used in this is the time of arrival of the radio signal sent by the mobile station 7 at the base stations 4, 5 and 6. The travel time of the received signal at any particular base station is related to the distance travelled given by formula:

$$R = cT, \tag{1}$$

wherein

R=mobile to base station distance (range)

c=the speed of light, and

T=the travel time of the radio signal.

The location information can also be based on measurements made at the receiving station to determine the signal strength, signal to noise ratio or any other such feature of the received signal from which it is possible to determine the distance between the transmitting station and the receiving station. It is noted that the measurement of the feature of the radio signal can be accomplished in the uplink and/or in the downlink, i.e. at the base station end or at the mobile station end or both. In case the mobile station is used for the measurements of the signal, it can use the radio network for sending the measurement results to an appropriate network element. The necessary location calculations and determinations based on various collected/defined data can be accomplished at the station (base station or the mobile station) or at an appropriate network element having an access to all required data.

In the situation illustrated by the three circles in FIG. 1 or two sectors 18 and 19 of a circle in FIG. 2 each distance measurement would generate a circle or a sector of a circle, respectively, centred at the measuring base station and having a radius r equal to the transmitting mobile station to receiving base station distance. In the absence of any measurement error, the intersection of the three circles of FIG. 1 and the intersection of the two circles of FIG. 2 would determine the accurate location of the mobile station 7.

Alternatively or additionally, the geographical location is obtained from a reliable external source, e.g. from the well known GPS (Global Positioning System). The GPS system is a satellite based system used in military and civil applications where accurate positioning is required, e.g. for the purposes of navigation. More accurate location information can be obtained through a differential GPS. In addition to the GPS, any other similar system capable of providing reliable location information to the can be used for this.

Figure 4:
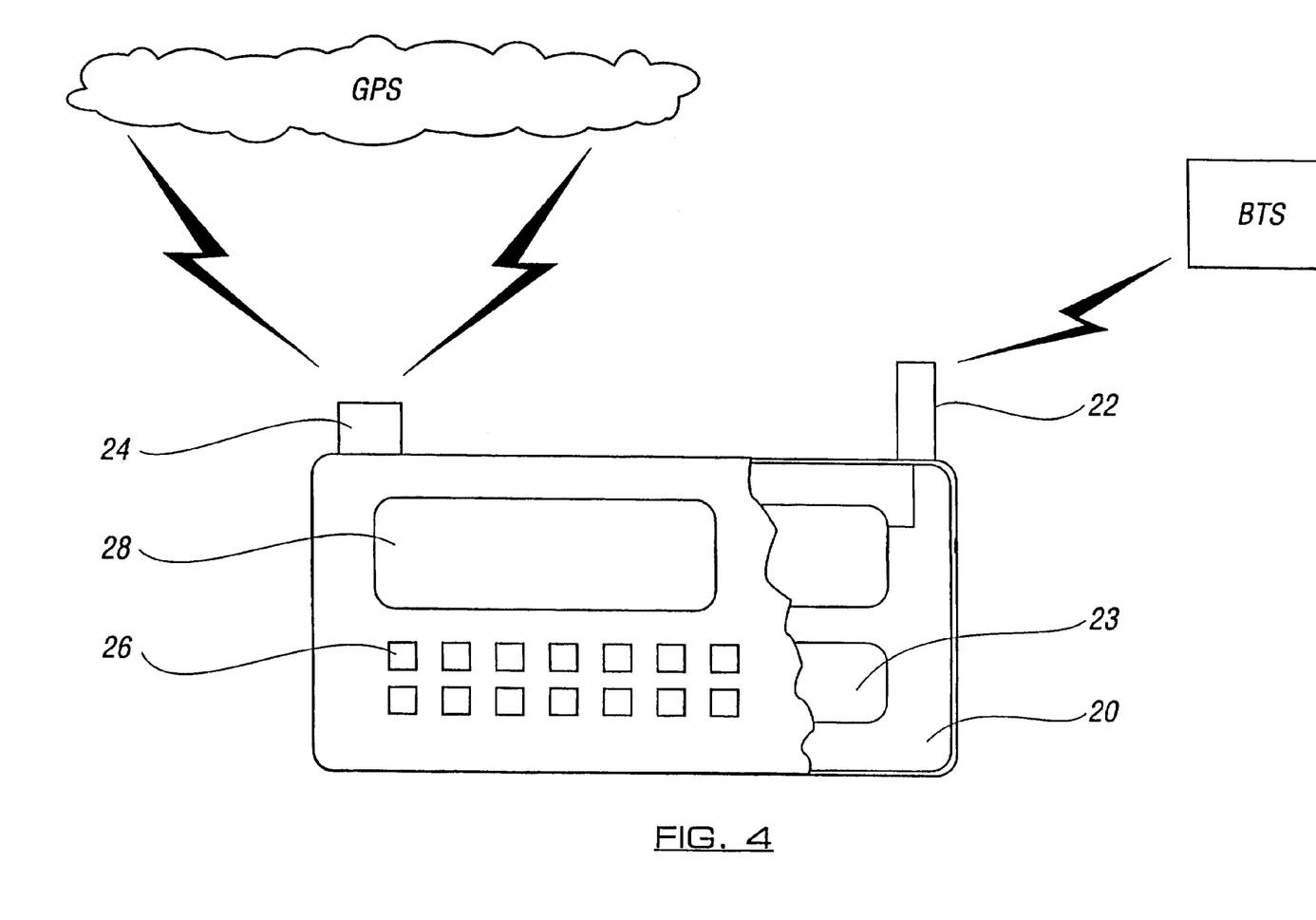
FIG. 4 shows a partially sectioned view of a mobile station apparatus embodying the invention.

The mobile station or the like 20 comprises an antenna 24 for receiving the location signals from the GPS satellites or similar system. These signals are used by the mobile station 20 to determine the current position of the mobile station 20 in a known manner. This determination can be accomplished by a processor 23.

According to one alternative the user of the mobile station 20 inputs manually precise location coordinates (e.g. in altitudes and latitudes, or by using street names or similar established address information), e.g. by means of keys 26, a voice recognition device, or similar input interface.

The mobile station 20 of FIG. 4 is provided with another antenna 22 for transmitting radio signals to and/or receiving radio signals from the base station BTS under examination. The mobile station can interface with the location server node 12 of FIG. 1 in several alternative manners. Since it is capable of establishing a radio communication with the base station, the mobile station may also use this radio interface for transmitting any messages and information to the location server or any other appropriate network element. The interface can also be a specific infrared or short range radio connection (such as a "bluetooth" connection) or a fixed connection using e.g. appropriate plugs and sockets or cabling between the mobile station 20 and the location server. The mobile station also comprises a display 28.

It should be appreciated that any other suitable technique for determining the position of the mobile station can be used as an alternative to the methods described previously. Method using Doppler shift techniques or time difference of arrival may be used. In some embodiments of the present invention, more than one method can be used. The location can be derived by the mobile station itself or by any of the network components. In either case, it should be ensured that the mobile station or the network element has the required information to determine the position of the mobile station. As will be discussed later, different techniques for calculating the position of the mobile station may be used at different times.

FIG. 3 schematically shows the location service model in which a LCS client 8 is arranged to request location information for one or more certain target mobile stations 20 from the LCS server node 12. The LCS server node 12 obtains positioning information obtained using one or more of the techniques discussed previously or any other suitable technique. This information is provided to the LCS Client 8. The particular requirements and characteristics of a LCS Client 8 are known to the LCS server 12 by its LCS client subscription profile. The particular LCS-related restrictions associated with each target mobile station are detailed in the target mobile station subscription profile. The location service feature permits the location of a target mobile station to be determined at any time whilst the MS is attached.

The LCS client 8 is a logical functional entity that makes a request to the LCS server node 12 for the location information of one or more target mobile stations. The LCS client 8 may reside in any entity (including a mobile station) within the PLMN or in an entity external to the PLMN.

The LCS server node 12 consists of a number of location service components and bearers needed to serve the LCS clients 8. The LCS server node 12 provides a platform which will enable the support of location based services in parallel with other telecommunication services such as speech, data, messaging, other teleservices, user applications and supplementary services. The LCS server node 12 responds to a location request from a properly authorized LCS client with location information for the target mobile stations specified by the LCS client 8 if considerations of target mobile station privacy are satisfied.

It shall be possible for the location determining process to make use of several sources of information in determining the location. Propagation and deployment conditions may limit the number or quality of measurements or additional measurements may be possible. Some mobile stations may also have additional (independent) sources of position information of the type discussed earlier. The LCS shall be capable of making use of the restricted or the extra information as appropriate for the service being requested.

The LCS Server 12 may provide the client 8, on request, the current or most recent geographic location (if available) of the target mobile station or, if the location fails, an error indication and optionally the reason for the failure.

The following are examples of possible clients. Clients broadcasting location related information to the mobile stations in a particular geographic area—e.g. on weather, traffic, hotels, restaurants; or the like. Clients recording anonymous location information (i.e. without any MS identifiers)—e.g. for traffic engineering and statistical purposes. Clients enhancing or supporting any supplementary service, IN (intelligent network) service, bearer service or teleservice subscribed to by the target MS subscriber. These are only examples and any other suitable clients may use the location service node. This service can of course be used to determine the location of a mobile station when it makes an emergency call.

The LCS Server 12 shall enable a network operator to charge LCS clients 8 for the LCS features that the network operator provides.

It may be possible for the LCS client 8 to specify or negotiate a (minimum) level of quality, such as accuracy, in a station location information request. Different applications demand different levels of positioning accuracy and other positioning performance parameters, so the levels of performance should be classified according to the type of applications. The quality of location information can involve parameters like accuracy, update frequency, time stamp, time-to-first-fix, reliability, continuity, etc. The quality of the generated location information can exceed the required level. In case location information is not available to the required quality level, the request can either be denied and the service execution terminated, or the user accepts the lower quality information. The quality level requirement of each service (application) could be set both by the subscriber and the service provider.

It may be possible to select the repetition rate of the location information update. The reports may be distributed to different clients at different rates. It may be possible to identify and report when the user's terminal enters or leaves a specified geographic area.

In one embodiment of the present invention, the classes are specified for the accuracy of the positioning information, with estimated probability of correctness. Every measurement will usually have a margin of error associated therewith. The classes should in preferred embodiments of the present invention take into account for what purpose the positioning information is required. The selection of the class can be determined by each client or by each mobile station. The class selected can also take into account the type of service to be provided by the client.

One benefit is for the user to define how accurate the location information is which is made available to different types of LCS clients 8. In one embodiment a logarithmic scale could be used, according to which the accuracy is for 90% of cases within.

(10 cm–1 m No accuracy class)
1 m–10 m Accuracy class A
10 m–100 m Accuracy class B
100 m–1 km Accuracy class C
1 km–10 km Accuracy class D
10 km–100 km Accuracy class E
"Not defined"—Accuracy class X The US regulations require that when an emergency call is made that the location of the mobile station be known to an accuracy of 50 m. This would fall into class B. As an alternative class B can be split in two (or even more) classes: 10 m–50 m Accuracy class B1 and 50 m–100 m Accuracy class B2. Alternatively or additionally, any other class can be split into two or more subclasses.

Class B could be used to identify that the user is in a given building so a service application can inform the user about the companies situated in this building or e.g. commercial services available in this building or area close by. Class D could be used to identify users in a given town and class E to identify users in a given county or region.

Another way to define the accuracy classes may be (for 90% of the cases):

Class A: best achievable accuracy for the UE being positioned (whatever that may be)
Class B: small area, township, city block, around 1 km
Class C: somewhat bigger area, town, around 10 km
Class D: big area, region, around 100 km
Class E: coverage area of the visited PLMN in question
Class F: no position information to be given
Class L: location area
Class R: routing area
Class O: cell coverage area
Class P: PLMN area
Class X: not defined One main use of the accuracy classes is to enable the user to define wanted privacy levels. This means that the subscriber can indicate how accurate position information different LCS clients may receive.

Different LCS client types are defined, so that the user can then define his LCS privacy profile for example as follows:

"LCS Client of type Emergency center is allowed to get class A LCS information"

"LCS client of general Internet server type can get class B LCS information in general but class A only after asking me"

"LCS client type "family members" can get LCS information of class A"

"LCS client type "my company" can get LCS information of class?"

Another possible use of the accuracy classes is to enable the operator to define location service tariffs for the client or the user: "Class A LCS accuracy will cost you x Euro every time when network is involved, Class B y Euro, class C is free of charge", etc.

In summary embodiments of the present invention make use of the feature that the geographical location of a station can be determined in a communications network with varying accuracy. The user of the station, or the network operator, will not automatically agree to communicate the best achievable accuracy of the station location to any client.

The user of the station is able to restrict the accuracy with which the location of the station is communicated to different clients. The user of the station is able to define this accuracy differently for different clients (types).

In embodiments of the invention the accuracy of the location information of a station is defined with different accuracy classes. Different types of clients are defined. It is possible to define what accuracy class is acceptable for the type of client. This combination of accuracy class per client type may be defined by the user or by the network operator in the target station subscription profile.

In preferred embodiments of the present invention, there is a plurality of different methods available for determining the position of the mobile station. The method for determining the position of the mobile station will be selected in accordance with the accuracy of the class of position information.

It should be appreciated that whilst embodiments of the present invention have been described in relation to mobile stations of a mobile telecommunications system, embodiments of the present invention are applicable to any other suitable type of user equipment of other types of systems providing location functionality. These system include satellite based communication systems as well as satellite based location systems.

The data can be transmitted between the various network element in packet form. In alternative embodiments of the invention the data may be sent in any suitable format.

The embodiment of the present invention has been described in the context of a TDMA system. This invention is also applicable to any other access techniques including frequency division multiple access (FDMA) and code division multiple access (CDMA) as well as any hybrids thereof. It should also be appreciated that base stations can sometimes be referred to as node B.

Embodiments of the invention may be used with fixed wireline access network. Such networks can determine the approximate location of the terminal and hence its user by mapping the access point of the terminal to the network in geographical coordinates. In this way also the user of the fixed terminal can be offered services that are valid and relevant for the geographical location of the user terminal. Thus embodiments of the present invention may be used with other communication systems where the users are connected to the network over fixed wire lines, since the geographical location of the access point of the fixed station can be determined with varying degree of accuracy.

In additional, the embodiments may also be used with various satellite based telecommunication systems.

It is also noted herein that while the above describes one exemplifying embodiment of the invention, there are several variations and modifications which may be made to the disclosed solution without departing from the scope of the present invention as defined in the appended claims.

The invention claimed is:

1. A telecommunications system comprising:
   at least one station;
   means for determining a location of said station;
   means for providing information on said location of said station to a location service client; and
   means for defining in dependence on information relating to the client, the accuracy of the location information to be provided to the client, wherein a plurality of different classes of location accuracy are provided.

2. A system as claimed in claim 1, wherein said classes are on a logarithmic scale.

3. A system as claimed in claim 2, wherein said scale is a log 10 scale.

4. A system as claimed in claim 3, wherein said classes include at least one of the following classes:
   1 m–10 m
   10 m–100 m
   100 m–1 km
   1 km–10 km
   10 km–100 km.

5. A system as claimed in claim 4, where at least one class is divided into two or more subclasses.

6. A system as claimed in claim 1, wherein a user of the at least one station is arranged to define the accuracy with which the location information is provided to the client.

7. A system as claimed in claim 1, wherein a plurality of clients are present of at least two different types, the accuracy of the location information provided to the client being dependent on the type of the client.

8. A system as claimed in claim 1, wherein the accuracy with which the information is provided is dependent on the type of service provided by the client.

9. A system as claimed in claim 1, wherein one class defines that no information is to be provided.

10. A system as claimed in claim 1, wherein one class is provided for the case where no location information is available.

11. A system as claimed in claim 1, wherein the costs associated with a service or function of the client is dependent on the accuracy of the location information.

12. A system as claimed in claim 11, wherein the costs are associated with the station.

13. A system as claimed in claim 12, wherein the costs are associated with the user or subscriber of the station.

14. A system as claimed in claim 11, wherein the costs are associated with the client.

15. A system as claimed in claim 1, wherein one of a plurality of different location methods is selected to determine the location of the station in dependence of the accuracy required for the location information.

16. A system as claimed in claim 1, wherein said station is a mobile station.

17. A system as claimed in claim 1, wherein said station is a terminal of a fixed wireline communication system.

18. A system as claimed in claims 1, wherein said station is a terminal of a satellite communication system.

19. A system as claimed in claim 1, wherein a location service node is provided along with at least one client, said location service node being arranged to provided location information with the required accuracy to the client.

20. A method for use in a telecommunications system comprising the steps of:
    determining a location of a station in said system;
    providing information on said location of said station to a location service client; and
    defining the accuracy of the location information to be provided to the client in dependence on information relating to the client, wherein a plurality of different classes of location accuracy are provided.

21. A station for a telecommunication system, comprising:
    a processor; and
    an antenna,
    said station being arranged to indicate to the telecommunication system, the accuracy of location information to be provided to a location service client, wherein the accuracy is indicated in terms of one of a plurality of different classes of location accuracy and in dependence on information relating to the location service client.

22. A station according to claim 21, wherein the station is a mobile station.

23. A location service client for a telecommunication system, comprising:
    means for sending a request for location information of a station to a location server, wherein the location service client is arranged to indicate a requested accuracy in the request for location information, wherein the requested accuracy is indicated in terms of one of plurality of different classes of location accuracy; and
    means for receiving location information having the accuracy class indicated in the request for location information.

* * * * *